US012728468B1

(12) United States Patent
Schofield et al.

(10) Patent No.: US 12,728,468 B1
(45) Date of Patent: Sep. 8, 2026

(54) CIRCULAR SAW BLADE INSPECTION DEVICE

(71) Applicant: K Industrial Supply, Inc., Prattville, AL (US)

(72) Inventors: Jason Schofield, Prattville, AL (US); Frank T. Roberts, Valdosta, GA (US)

( * ) Notice: Subject to any disclaimer, the term of this patent is extended or adjusted under 35 U.S.C. 154(b) by 110 days.

(21) Appl. No.: 18/641,353

(22) Filed: Apr. 20, 2024

(51) Int. Cl.
*B23D 59/00* (2006.01)
*B23D 61/02* (2006.01)

(52) U.S. Cl.
CPC ......... *B23D 59/001* (2013.01); *B23D 61/025* (2013.01)

(58) Field of Classification Search
CPC ................................ B23D 63/18; B23D 65/00
See application file for complete search history.

(56) References Cited

U.S. PATENT DOCUMENTS 2,623,414 A 12/1952 Senard
3,680,417 A 8/1972 Wells
3,916,680 A 11/1975 Allen et al.
3,919,900 A 11/1975 Allen et al.
3,964,348 A 6/1976 Dawson
4,027,531 A 6/1977 Dawson
4,107,983 A * 8/1978 Dawson ................... G01N 3/20 73/831
4,289,053 A 9/1981 Sawamura
4,355,555 A 10/1982 Kobayashi et al.
4,418,589 A * 12/1983 Cowart, Sr. .......... B23D 61/025 76/112
4,437,367 A 3/1984 Hauser
4,557,168 A 12/1985 Tokiwa
4,644,832 A 2/1987 Smith
4,674,374 A 6/1987 Sadahiro et al.
4,766,790 A 8/1988 Harris
4,852,430 A 8/1989 Oppliger et al.
5,070,751 A 12/1991 Harris
5,163,334 A 11/1992 Li et al.
5,176,055 A 1/1993 Wijesinghe et al.
5,237,897 A 8/1993 Wijesinghe et al.
5,269,205 A * 12/1993 Oppliger ................ B23D 63/18 76/27
5,383,444 A * 1/1995 Kimura .................. B28D 5/028 451/8
5,447,086 A * 9/1995 Wittmaier ............ B26D 7/2621 83/676
6,105,446 A 8/2000 Rein
6,105,466 A 8/2000 Oppliger
8,520,066 B2 8/2013 Chang et al.
(Continued)

FOREIGN PATENT DOCUMENTS

JP H06278128 A * 10/1994 ........... B23D 59/002
WO 9012669 A1 11/1990
(Continued)

*Primary Examiner* — Jennifer S Matthews
(74) *Attorney, Agent, or Firm* — AdamsIP, LLC; Stephen Thompson; J. Hunter Adams

(57) ABSTRACT

A device and method for inspecting circular saw blades and measuring certain physical qualities of circular saw blades is provided. The device includes a holder for mounting a circular saw blade onto the device, a distance indicator for indicating relative movement of the saw blade when mounted, and opposing electromagnets for inducing movement of portions of the saw blade to measure tension in the blade.

18 Claims, 8 Drawing Sheets

(56) References Cited

U.S. PATENT DOCUMENTS

| | | | | |
|---|---|---|---|---|
| 10,081,116 | B2 | 9/2018 | Adair et al. | |
| 10,150,172 | B2 | 12/2018 | Harris | |
| 2001/0034561 | A1 | 10/2001 | Myrfield | |
| 2006/0137201 | A1 | 6/2006 | Dixon et al. | |
| 2007/0006706 | A1 | 1/2007 | Watanabe et al. | |
| 2009/0126549 | A1 | 5/2009 | Dietz et al. | |
| 2014/0026673 | A1 | 1/2014 | Lemaster | |
| 2015/0020660 | A1 | 1/2015 | Jeng et al. | |
| 2016/0303669 | A1 | 10/2016 | Harris | |
| 2016/0303670 | A1 | 10/2016 | Harris | |
| 2019/0224764 | A1* | 7/2019 | Harris | B23D 45/021 |

FOREIGN PATENT DOCUMENTS

| | | | | |
|---|---|---|---|---|
| WO | 9219407 | A2 | 11/1992 | |
| WO | WO-9636453 | A1 * | 11/1996 | B23D 63/18 |
| WO | 2006103466 | A1 | 10/2006 | |
| WO | 2007014979 | A1 | 2/2007 | |
| WO | WO-2007134820 | A1 * | 11/2007 | B23D 55/084 |
| WO | 2010069530 | A1 | 6/2010 | |
| WO | 2015192963 | A1 | 12/2015 | |
| WO | 2016171824 | A1 | 10/2016 | |
| WO | 2020031051 | A1 | 2/2020 | |
| WO | 2021170429 | A1 | 9/2021 | |
| WO | 2021237066 | A1 | 11/2021 | |

* cited by examiner

CIRCULAR SAW BLADE INSPECTION DEVICE

FIELD OF THE INVENTION

The present invention relates generally to a device for inspecting circular saw blades and measuring certain physical qualities of circular saw blades.

BACKGROUND

Circular saw blades are commonly used in various industries primarily for cutting various types of wood. The performance and lifespan of a saw blade are largely dependent on its physical characteristics, including its diameter, thickness, the shape and size of its teeth, and also the tension of the saw blade. With respect to saw blades, tension refers to the stress distribution within the blade and plays an important role in the functioning of the saw blade. The tension of a saw blade is typically induced during the manufacturing process through a procedure known as hammering or tensioning. This procedure involves applying mechanical force to specific areas of the blade to create compressive stress. The purpose of this is to counteract the tensile stress that is generated in the rim of the blade during operation, thereby preventing the blade from warping or vibrating excessively. The tension in a saw blade is not uniform but varies across the surface of the blade. Typically, the tension is higher near the rim of the blade and lower near the eye of the blade. This distribution of tension is what allows the blade to remain flat and stable during operation, despite the centrifugal force acting on the rim of the blade.

Measuring the tension in a saw blade is a complex task that requires specialized equipment. Traditional methods of tension measurement may involve subjective visual assessment using straight edges placed against the blade or the use of dial indicators or similar mechanical devices that measure the deflection of the blade under a known load, which may often be applied by a pneumatic actuator or similar device. However, such methods can be difficult to perform accurately and consistently with results often varying from person to person. Such methods can also be time-consuming when testing numerous saw blades used within a facility. Individual blades must first be mounted onto the testing equipment before performing the test. Blades are typically mounted using a collar that is threaded onto an arbor to clamp the saw in place. The mounting process may thus be time-consuming when mounting and then detaching numerous blades, which can significantly slow production.

SUMMARY

In one aspect, a device for inspecting circular saw blades is provided. The device is designed to allow a user to quickly mount a saw blade onto the device and accurately measure the tension of the blade, as well as other physical characteristics such as axial and radial runout of the saw blade. The device comprises a holder configured to removably secure a saw blade to the holder, two opposing electromagnets each mounted in a position adjacent to a surface of the saw blade on a same side of the saw blade when the saw blade is secured to the holder, and a distance indicator mounted in a position adjacent to the surface of the saw blade and configured to indicate variations of distance of the surface of the saw blade relative to the distance indicator when the saw blade is secured to the holder. The holder is configured to rotate about an axis of rotation such that the saw blade is also rotatable about the axis of rotation when the saw blade is secured to the holder. The opposing electromagnets are preferably vertically aligned so that one electromagnet is positioned adjacent to a top side of the saw blade and the opposing electromagnet is positioned adjacent to an opposing bottom side of the saw blade on an opposing side of a central bore opening of the saw blade about which the saw blade can rotate when mounted onto the device.

An electric current may be applied to each of the electromagnets to induce a magnetic field and turned off to eliminate the magnetic field. To use the device to test a circular saw blade, the electromagnets may be deactivated, and the saw blade may be mounted onto the holder. With the blade mounted and the electromagnets both deactivated, there is a small gap between the surface of the saw blade and each electromagnet. The holder and saw blade may then be rotated about the axis of rotation, and the distance indicator may be used to determine runout of the saw blade by measuring variations of distance of the surface of the saw blade relative to the distance indicator. The electromagnets may then be activated by supplying an electric current to each electromagnet to induce a magnetic field, thereby causing opposing first portions of the saw blade to be magnetically drawn toward and contact each of the two opposing electromagnets. When this occurs, movement of each of the first portions of the saw blade in an inward direction toward each corresponding electromagnet causes a corresponding movement of two opposing second portions of the saw blade that are generally 90 degrees apart from the first portions. Typically, the second portions of the blade also move in an inward direction, although the second portions may also move in an outward direction indicating negative tension. In either case, tension on the saw blade may be determined using the distance indicator by measuring a relative distance differential of the second portion of the saw blade relative to a first position of the second portion in which the two opposing electromagnets are deactivated and a second position of the second portion in which the two opposing electromagnets are activated.

In a preferred embodiment, the holder comprises a plurality of permanent magnets for removably securing the saw blade to the holder. Thus, the saw blade may be mounted onto the holder by placing the blade against the permanent magnets to magnetically secure the blade to the holder, which allows each blade to be quickly mounted onto and detached from the holder. The use of electromagnets for testing tension also allows the testing procedure to be performed quickly and accurately.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
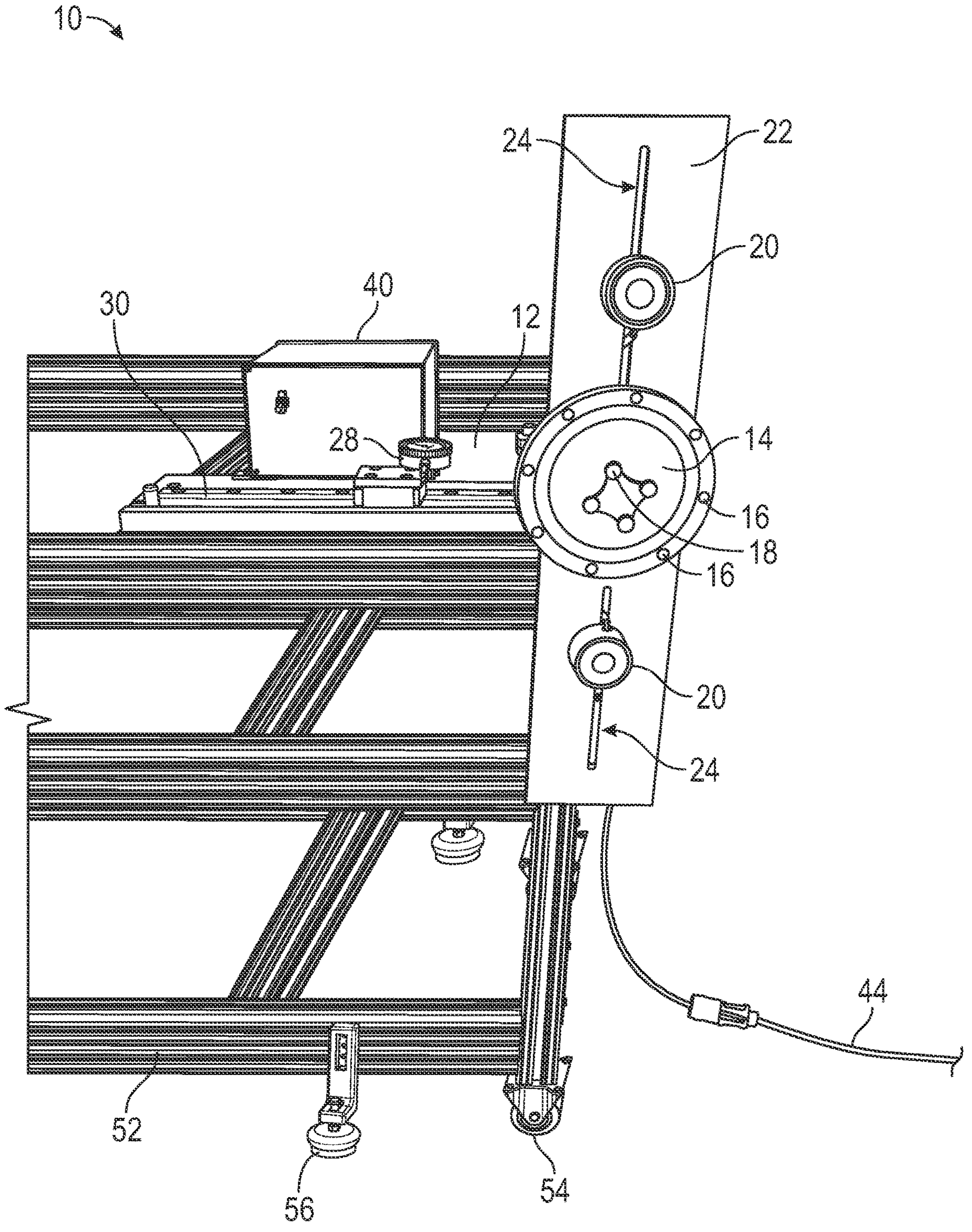
FIG. 1 shows a front perspective view of a circular saw blade inspection device in accordance with the present disclosure.
Figure 2:
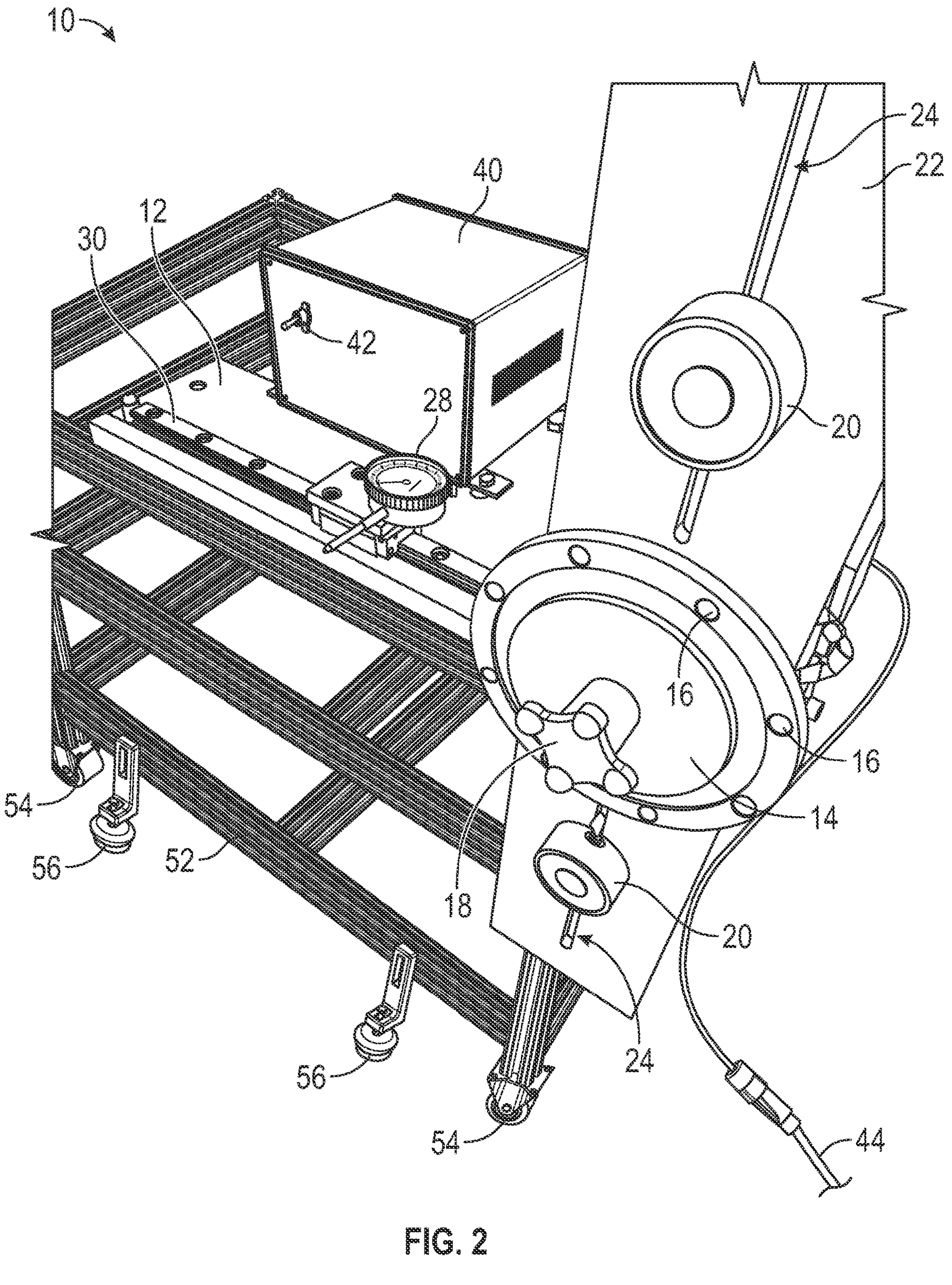
FIG. 2 shows a side perspective view of a circular saw blade inspection device in accordance with the present disclosure.
Figure 3:
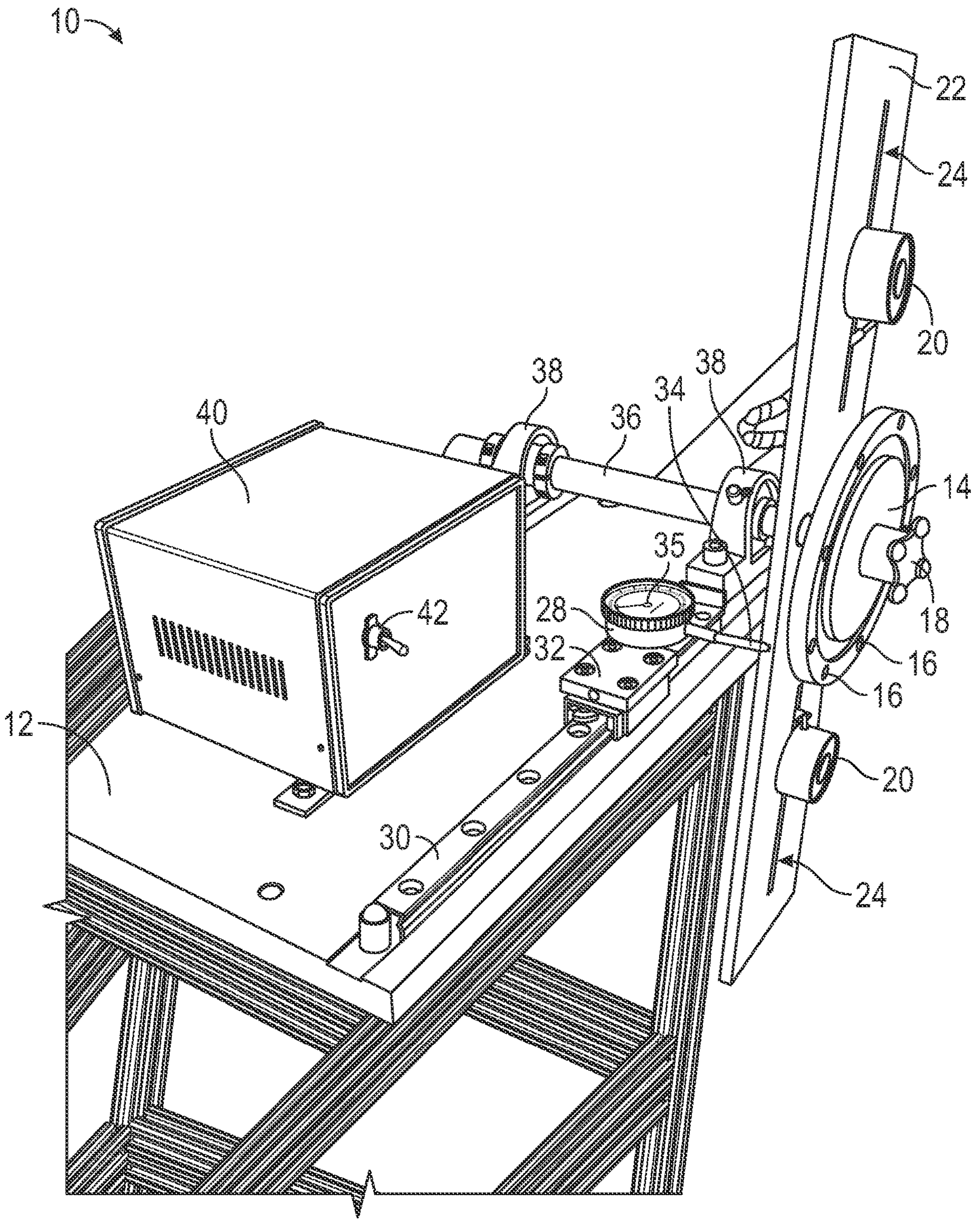
FIG. 3 shows a side perspective view of a circular saw blade inspection device in accordance with the present disclosure.

In one aspect, a device 10 for inspecting circular saw blades is provided. FIGS. 1-7 illustrate a preferred embodiment of the device 10. The device 10 is designed to allow a user to quickly mount a circular saw blade 26 onto the device 10 and accurately measure the tension of the blade 26 and/or other physical characteristics such as axial and radial runout of the saw blade 26. FIGS. 1-3 illustrate the device 10 without a saw blade 26 mounted thereon, and FIGS. 4-7 illustrate the device 10 with a saw blade 26 mounted thereon. The device 10 comprises a holder 14 configured to removably secure a saw blade 26 to the holder 14, two opposing electromagnets 20 each mounted in a position adjacent to a surface 27 of the saw blade 26 on a same side of the saw blade 26 when the saw blade 26 is secured to the holder 14, and a distance indicator 28 mounted in a position adjacent to the surface 27 of the saw blade 26 and configured to indicate variations of distance of the surface 27 of the saw blade 26 relative to the distance indicator 28 when the saw blade 26 is secured to the holder 14. The holder 14 is configured to rotate about an axis of rotation 60 such that the saw blade 26 is also rotatable about the axis of rotation 60 when the saw blade 26 is secured to the holder 14.

As best seen in FIG. 2, the device 10 may be mounted onto a portable stand 52 or similar type of structure of an appropriate height for a user to mount a saw blade 26 onto the stand 52. The stand 52 may include one or more wheels 54 to move the stand 52 to a desired location. The stand 52 may also include one or more stoppers 56 to retain the stand 52 in a desired location and prevent unwanted movement during operation. Components of the device 10 may be mounted onto a base 12 that is attached to the stand 52 or other structure to support certain components of the device 10 in a fixed position. The base 12 is preferably a generally flat and rigid piece of material, which may be constructed of metal, plastic, or any other suitable material.

Figure 4:
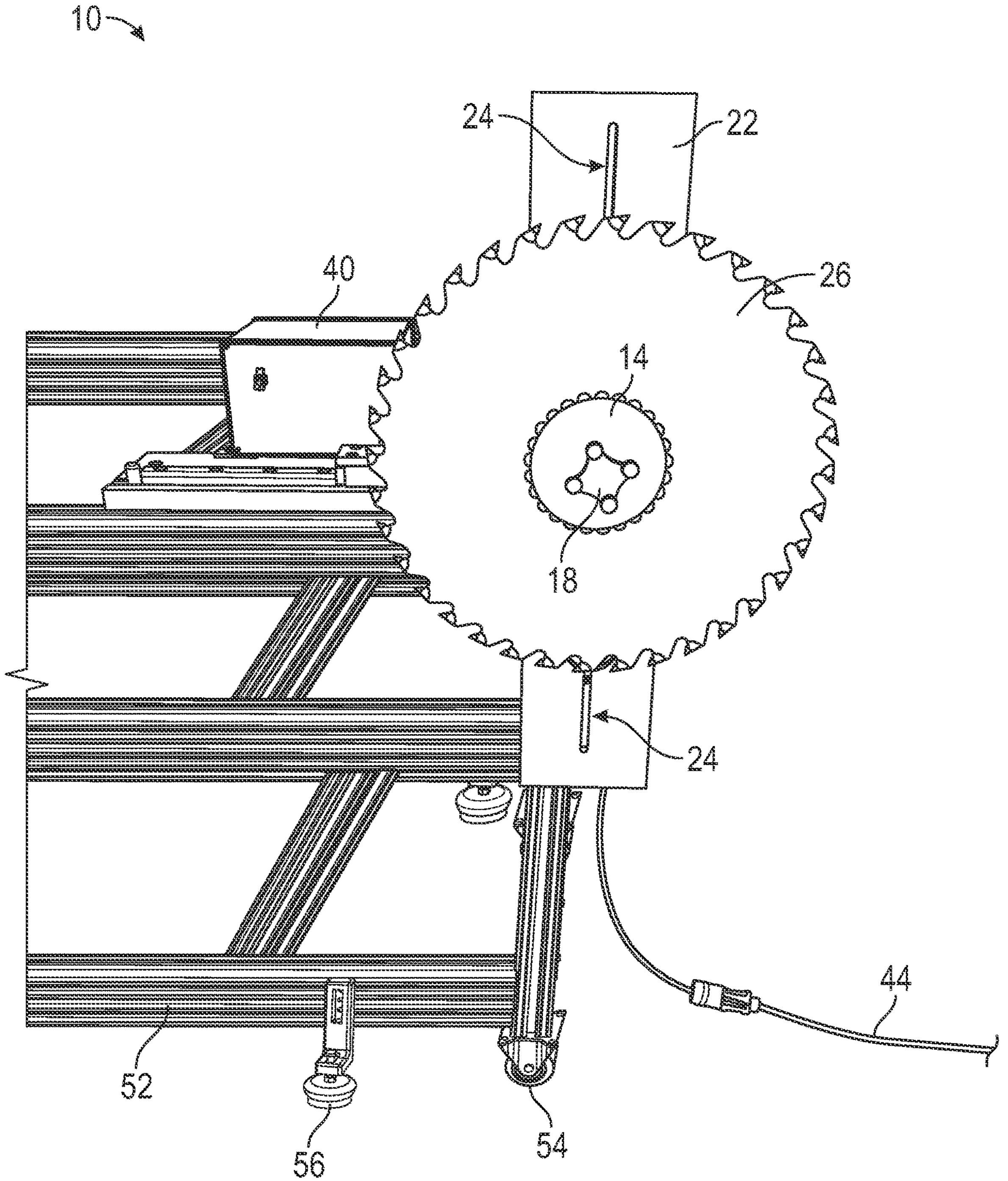
FIG. 4 shows a front perspective view of a circular saw blade inspection device with a saw blade mounted thereon in accordance with the present disclosure.

In a preferred embodiment, as best seen in FIG. 1, the holder 14 comprises a plurality of permanent magnets 16 configured to removably secure the saw blade 26 to the holder 14. Because saw blades 26 are typically constructed of a ferromagnetic material, such as steel, the saw blade 26 may be mounted onto the holder 14 by placing the blade 26 against the permanent magnets 16 to magnetically secure the blade 26 to the holder 14. The holder 14 may comprise a flat surface onto which the magnets 16 are installed around a perimeter of the holder 14 and a raised portion sized to fit within a central bore opening 68 so that the magnets 16 contact an eye portion of the blade 26 disposed around the bore 68, as best seen in FIG. 4. In alternative embodiments, the holder 14 may comprise various types of clamps, threaded collars, or other similar devices suitable for removably securing a circular saw blade 26 to the holder 14. In a preferred embodiment, the holder 14 further comprises a handle 18 configured to allow manual rotation of the holder 14 as well as the blade 26 secured thereto about the axis of rotation 60. In an alternative embodiment, rotation of the holder 14 and blade 26 may be automated.

Figure 7:
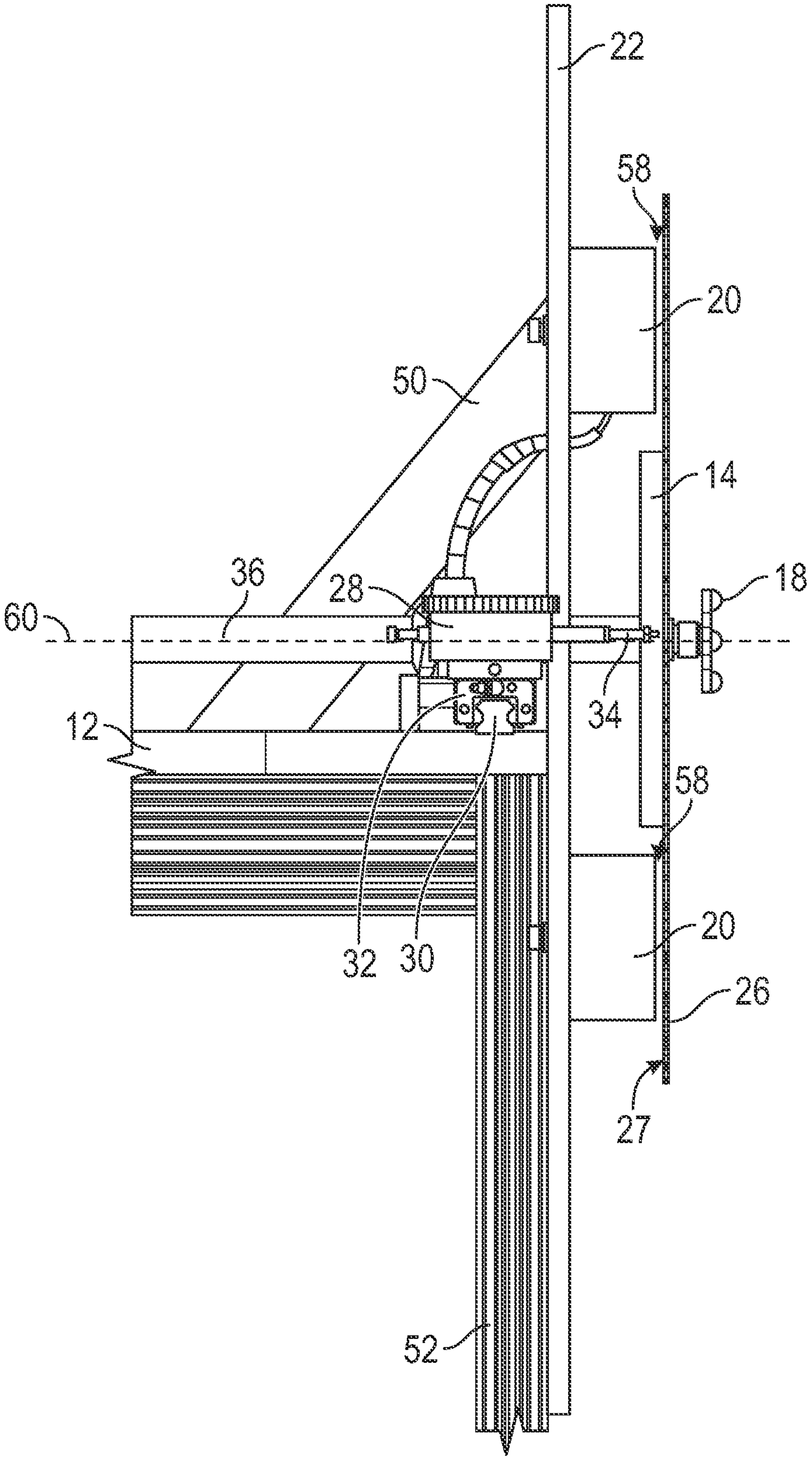
FIG. 7 shows a side elevational view of a circular saw blade inspection device with a saw blade mounted thereon in accordance with the present disclosure.
Figure 9:
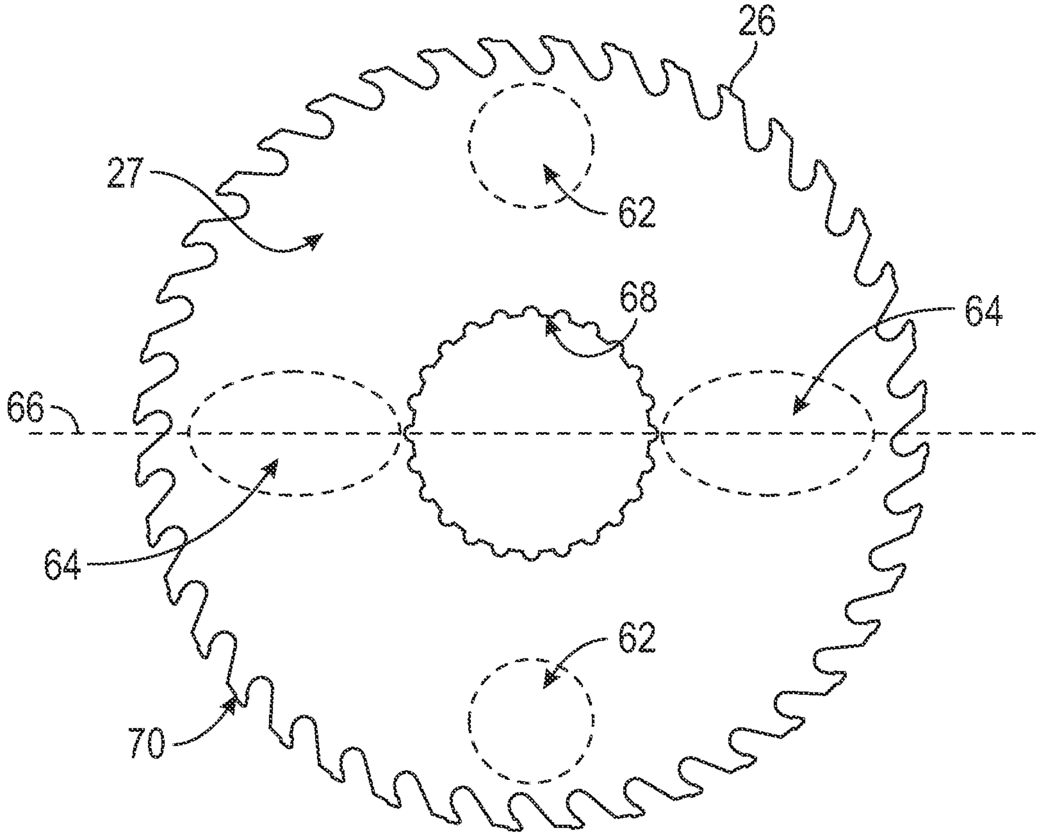
FIG. 9 shows a side elevational view of a circular saw blade in accordance with the present disclosure.

In a preferred embodiment, as best seen in FIGS. 1 and 7, the two opposing electromagnets 20 are vertically aligned so that one electromagnet 20 is positioned directly above the other electromagnet 20 along a straight vertical line. In this embodiment, one electromagnet is positioned adjacent to a top side of the saw blade 26 and the opposing electromagnet 20 is positioned adjacent to an opposing bottom side of the saw blade 26 on an opposing side of the bore 68 of the saw blade 26, the center of which defines the axis of rotation 60 when the blade 26 is mounted onto the holder 14. FIG. 9 illustrates an example saw blade 26 disposed in an upright position in which the blade 26 is mounted onto the holder 14 with areas 62 each generally indicating an area of the blade 26 that may be disposed adjacent to each respective one of the electromagnets 20. As best seen in FIG. 7, the two opposing electromagnets 20 are each mounted in a position relative to the surface 27 of the saw blade 26 such that there is a small gap 58 between each of the electromagnets 20 and the surface 27 of the saw blade 26 when an electric current to each of the electromagnets 20 is turned off to deactivate the electromagnets 20. When mounted in this position, the surface 27 of the saw blade 26 is drawn toward and contacts each of the electromagnets 20 when the electric current to each of the electromagnets 20 is turned on to activate the electromagnets 20, thereby inducing a magnetic field to cause the saw blade 26 to flex so that there are surface deflections in the surface 27 of the blade 26.

Figure 5:
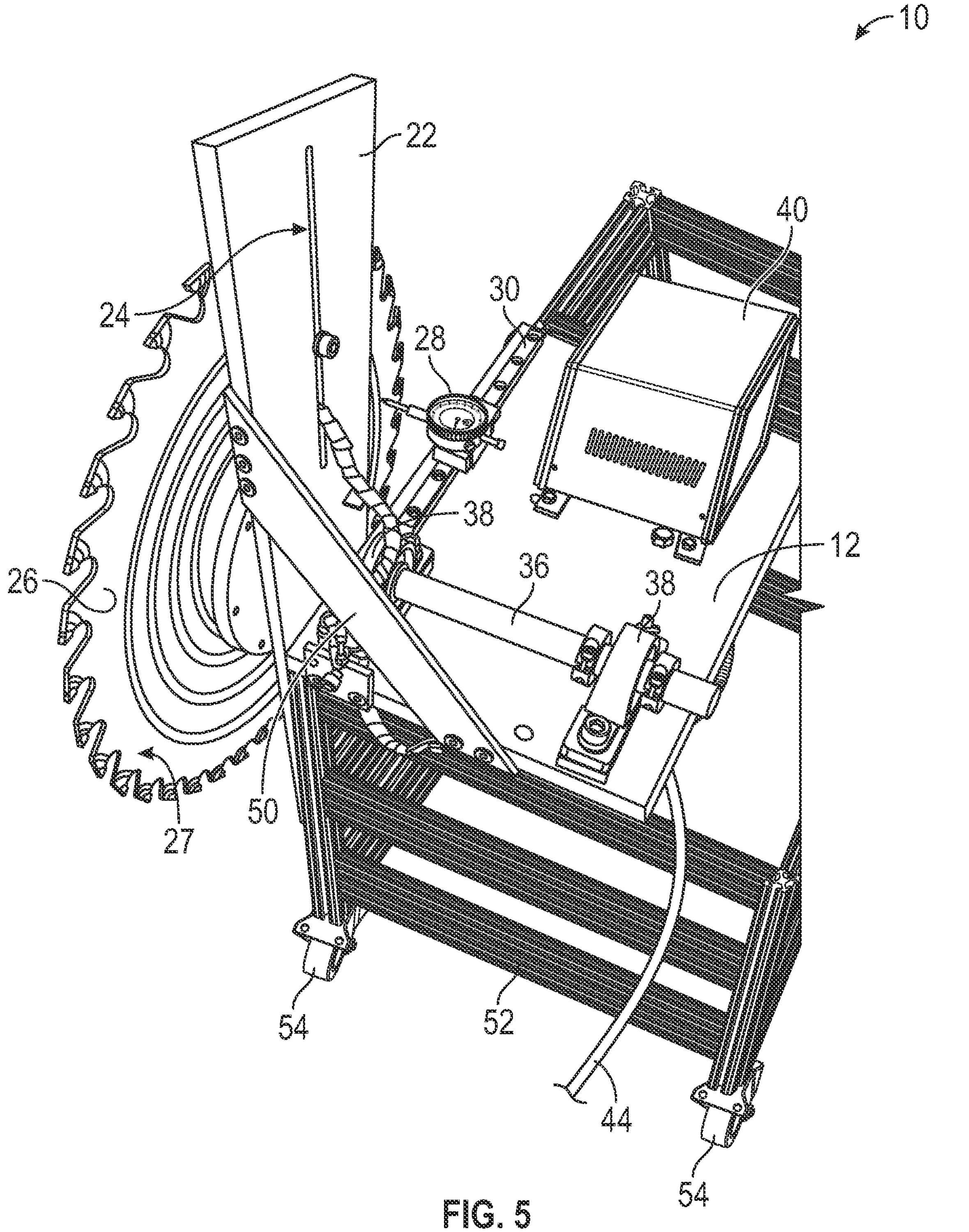
FIG. 5 shows a rear perspective view of a circular saw blade inspection device with a saw blade mounted thereon in accordance with the present disclosure.

In a preferred embodiment, each of the electromagnets 20 may be mounted on a bracket 22 to support the electromagnets in a fixed position. The position of each of the electromagnets 20 is preferably vertically adjustable so that the vertical position of the electromagnets 20 relative to the blade 26 may be adjusted. To facilitate vertical adjustment, the bracket 22 preferably has vertically oriented slots 24 along which the electromagnets 20 can be positioned using a bolt or similar type of fastener. The bracket 22 may be attached to the base 12, the stand 52, or other portion of the device 10 using a brace 50 to retain the bracket 22 in a generally fixed position, as best seen in FIG. 5.

Figure 6:
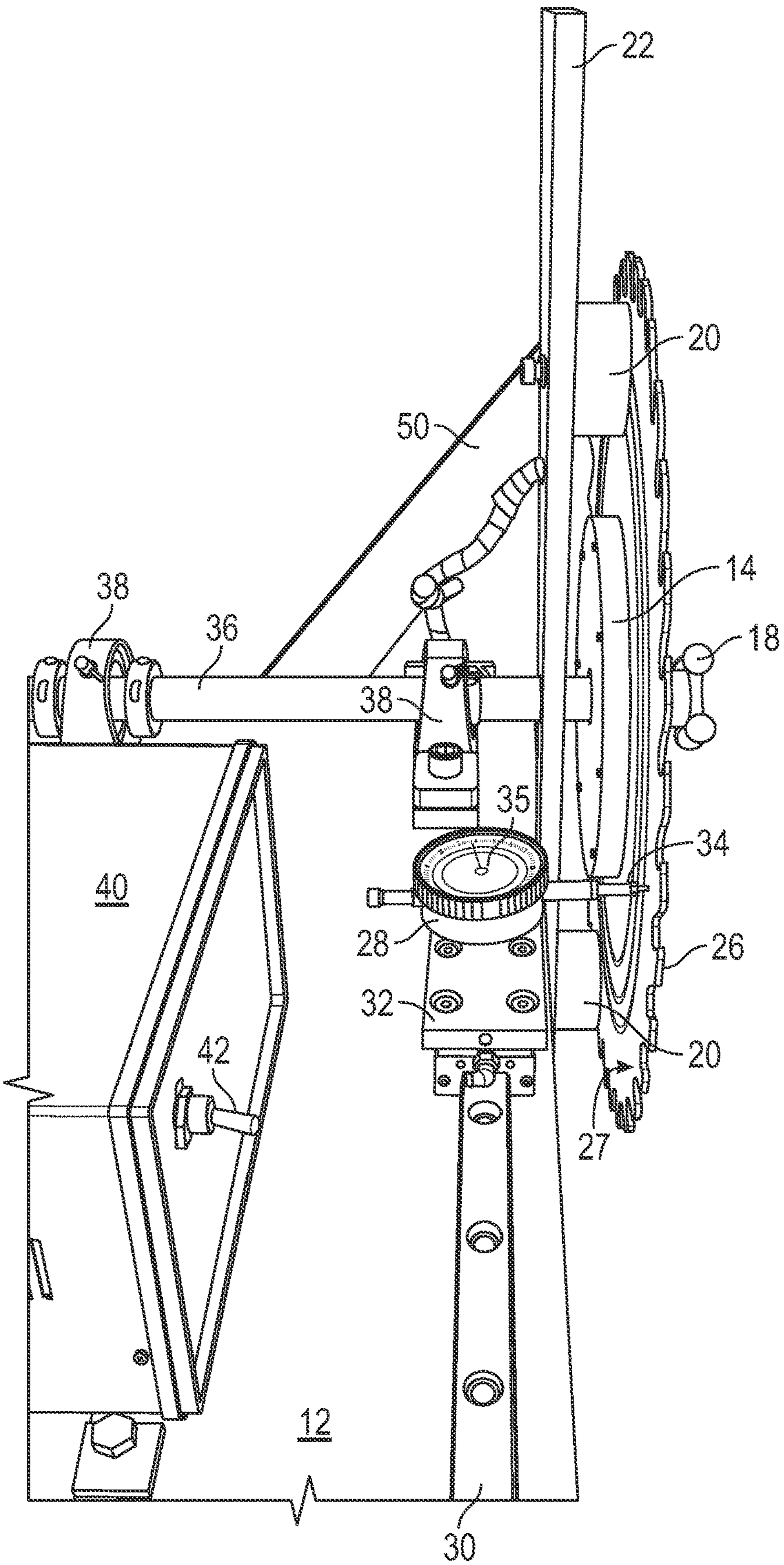
FIG. 6 shows a side perspective view of a circular saw blade inspection device with a saw blade mounted thereon in accordance with the present disclosure.

In a preferred embodiment, the holder 14 is mounted onto an end of an axle 36, as best seen in FIGS. 3 and 6, to facilitate rotation of the holder 14 and saw blade 26. The axle 36 thus defines the axis of rotation 60. In a preferred embodiment, an axial position of the axle 36 is axially adjustable such that a width of gap 58 between the surface 27 of the blade 26 and each electromagnet 20 is adjustable by adjusting the axial position of the axle 36, thereby adjusting the position of the holder 14 on which the blade 26 is mounted relative to the fixed electromagnets 20. The axle 36 may be mounted onto the base 12 using a pair of pillow block bearings 38 that are mounted onto the base 12. To allow axial adjustment of the axle 36 but also maintain a consistent width of gap 58 during operation of the device 10, lock collars may be installed on the axle 36 directly adjacent to one or both of the pillow block bearings 38, as best seen in FIG. 5. The lock collars rotate with the axle 36 and prevent axial movement of the axle 36 relative to the pillow block bearings 38 when the lock collars are locked down onto the axle 36. To adjust the axial position of the axle 36, the lock collars may be loosened, and then the axial position of the axle 36 within the pillow block bearings 38 may be adjusted before re-locking down the lock collars onto the axle 36. Alternatively, the axle 36 may be retained in a fixed axial position and spacers or similar devices may be used to adjust the horizontal position of the electromagnets 20 relative to the surface 27 of the blade 26. In another alternative embodiment, the device 10 may include an automated system for automatically adjusting the vertical position of each of the electromagnets 20 to position each of the electromagnets 20 in a desired position, such as a position near the rim 70 of the blade 26 depending on the size of the blade 26, and/or for automatically adjusting the width of the gaps 58 by automatically adjusting the horizontal position of each of the electromagnets 20 relative to the surface 27 of the blade 26.

In a preferred embodiment, the distance indicator 28 comprises a dial indicator. As best seen in FIGS. 3 and 6, the dial indicator 28 may include a probe 34 and a dial display 35. As shown in FIG. 6, an end of the probe 34 may be set against the surface 27 of the saw blade 26, and the dial display 35 may be set to a zero setting. The dial display 28 may include a rack and pinion mechanism that allows the probe 34 to move axially back and forth so that the dial display 35 indicates relative variations in distance or surface deflections of the surface 27 of the saw blade 26 relative to the dial indicator 28 as the saw blade 26 flexes or rotates around the axis of rotation 60. In alternative embodiments, the dial indicator 28 may have a digital display rather than a dial display 35. In other embodiments, the rack and pinion mechanism may be replaced by linear encoders or other types of analog or digital devices suitable for indicating relatively small distance variations and tolerances. For instance, in one alternative embodiment, the distance indicator 28 may comprise a laser sensor or other type of proximity sensor.

As best seen in FIGS. 6 and 7, the position of the dial indicator 28 is linearly adjustable along a line 66 that is generally perpendicular to the axis of rotation 60. In a preferred embodiment, the line along which the position of the dial indicator 28 is linearly adjustable is generally horizontal and may be defined by the position of the indicator 28 along a linear rail 30 on which the dial indicator 28 is slidably mounted so that the dial indicator 28 can slide longitudinally along a length of the rail 30. To this end, the dial indicator 28 may be attached to a sliding mount 32 that is slidably mounted onto the rail 30, which may be attached to the base 12. Alternatively, adjustment of the linear position of the dial indicator 28 may be automated. In a preferred embodiment, the line 66 along which the position of the dial indicator 28 is linearly adjustable is also generally perpendicular to a vertical line extending directly between the two opposing electromagnets 20. In another preferred embodiment, the position at which the dial indicator 28 measures surface deflections is about 90 degrees from the position of each of the two opposing electromagnets 20 relative to the axis of rotation 60, as best seen in FIGS. 1 and 7.

In a preferred embodiment, as best seen in FIG. 7, the holder 14 is configured to removably secure the saw blade 26 to the holder 14 in a position in which the saw blade 26 is retained in a substantially vertical plane so that the blade 26 is positioned adjacent to each of the vertically aligned electromagnets 20 with gaps 58 between each electromagnet 20 and the surface 27 of the blade 26. The blade 26 is preferably flattened to a sufficient degree so that each of the two gaps 58 are approximately the same width or at least within a defined tolerance. In this embodiment, the axis of rotation 60 and the rail 30 along which the dial indicator 28 is movable are both disposed in a generally horizontal position. Referring to the saw blade 26 illustrated in FIG. 9, the dial indicator 28 can generally be moved along adjustment line 66 by moving the indicator 28 along rail 30 to position the probe 34 of the indicator 28 generally within either of areas 64, depending on which side of the blade 26 is contacting the probe 34. Thus, the position of the probe 34 of the dial indicator 28 may be adjusted to be positioned anywhere along line 66 generally between the rim 70 of the blade 26 and a central bore opening 68. The two electromagnets 20 are positioned generally adjacent to each respective one of areas 62. The electromagnets 20 are each preferably positioned generally near the rim 70 of the saw blade 26. Thus, areas 62 and areas 64 are generally disposed at 90 degree angles to each other as measured about the axis of rotation 60 from the center of bore opening 68 when the blade 26 is mounted onto the holder 14. In alternative embodiments, the electromagnets 20, axis of rotation 60, and distance indicator 28 adjustment line 66 may have different orientations relative to horizontal and vertical planes. For instance, the electromagnets 20 could be horizontally aligned with rail 30 being disposed vertically, or these components could be offset from horizontal or vertical planes, though indicator 28 adjustment line 66 as defined by movement of the indicator 28 along rail 30 is preferably perpendicular to a line extending directly between the two electromagnets 20 so that measurement areas 64 on the saw blade 26 are generally disposed at 90 degree angles to electromagnet 20 engagement areas 62, as this orientation allows for accurate measurements of rim tension in the blade 26 when using the electromagnets 20 to cause the blade 26 to flex and thus produce surface deflections.

In an alternative embodiment, the rail 30 may be disposed at an angle of approximately 45 degrees relative to the vertical line extending between the two electromagnets 20, which may allow the indicator 28 to measure a body tension of the saw blade 26. In other embodiments, the device 10 may include multiple distance indicators 28 configured to measure surface deflections and thus tension in the blade 26 at different locations on the surface 27 of the blade 26 so that the device 10 may be used to measure both rim tension and body tension of the blade 26.

Figure 8:
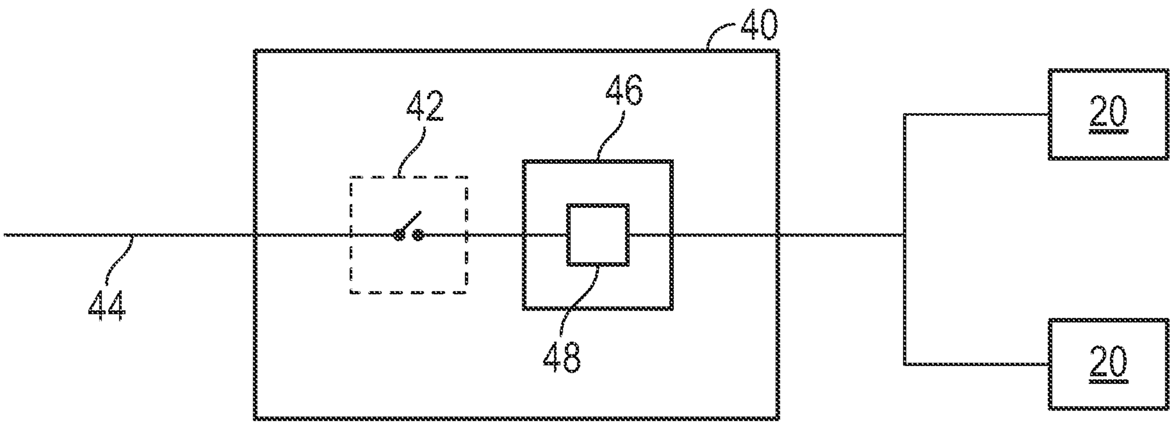
FIG. 8 shows a schematic view of an electromagnet power system in accordance with the present disclosure.

FIG. 8 illustrates a schematic diagram of an electromagnet power system, some components of which may be housed within an enclosure 40, which may be mounted onto the base 12 or other structures of the device 10 for easy access by a user. The system includes a switch 42 for supplying or turning off electric current to both of the electromagnets 20 to activate and deactivate the electromagnets 20. The switch 42 is preferably disposed on an exterior of the enclosure 40, as best seen in FIG. 3. The system further comprises a power supply 46, which may be connected to mains AC (alternating current) power via a power cord 44. The power supply 46 comprises a voltage regulator 48 that converts the mains AC power to a low-voltage regulated DC (direct current) power for supplying electric current to the electromagnets 20.

A method of using the device 10 for measuring tension of a circular saw blade 26 is also provided. The electromagnets 20 are first deactivated, and the saw blade 26 may then be mounted onto the holder 14, preferably by contacting the saw blade 26 with permanent magnets 16 disposed on the holder 14. With the electromagnets 20 deactivated, small gaps 58 between each electromagnet 20 and a surface 27 of the saw blade 26 should be present. In a preferred embodiment, each of the gaps 58 should have a width generally between a range of about 0.050 to 0.080 inches. This range generally provides an adequate distance between the electromagnets 20 and the surface 27 of the blade 26 so that the blade 26 is sufficiently close to the electromagnets 20 for the electromagnets 20 to magnetically attract the blade 26 to flex the blade 26 when the electromagnets 20 are activated but also sufficiently far from the electromagnets 20 to allow for a sufficient degree of flexing of the blade 26 when the electromagnets 20 are activated. If the gaps 58 are outside of the range, the width of the gaps 58 may be adjusted by moving the electromagnets 20 toward or away from the blade 26.

Before measuring the tension of the blade 26, the device 10 may be used to measure runout of the blade 26. To measure runout, the saw blade 26 may be rotated with the electromagnets 20 deactivated. The handle 18 may be used to manually rotate the blade 26. The dial indicator 28 may then be used to measure variations of the distance of the surface 27 of the saw blade 26 relative to the dial indicator 28 as the saw blade 26 rotates.

To measure the tension of the blade 26, the position of the dial indicator 28 may be linearly adjusted along the rail 30 to adjust the position of the probe 34 along adjustment line 66 to a desired position, preferably near an outer rim 70 of the blade 26. The probe 34 may generally be moved to any desired position between the rim 70 of the saw blade 26 and an eye of the saw blade 26, which is an area of the blade 26 directly surrounding the bore opening 68. The two opposing electromagnets 20 may then be activated by supplying an electric current to each of the electromagnets 20 using switch 42 to induce a magnetic field, thereby causing opposing first portions 62 of the saw blade 26 adjacent to the electromagnets 20 to be magnetically drawn toward and contact each of the opposing electromagnets 20. The first portions are generally indicated by the areas 62 shown in dashed lines on the saw blade 26 in FIG. 9. This movement induced by the magnetic field causes the saw blade 26 to flex, thereby causing surface deflections of the surface 27 of the blade 26. Thus, when the first portions 62 are drawn toward the electromagnets 20 to close each of the gaps 58, movement of each of the first portions 62 of the saw blade 26 in an inward direction toward each corresponding electromagnet 20 causes a corresponding movement of two opposing second portions 64 of the saw blade 26 that are generally 90 degrees apart from the first portions 62. The second portions are generally indicated by the areas 64 shown in dashed lines on the saw blade 26 in FIG. 9. Typically, the second portions 64 of the blade also move in an inward direction toward the electromagnets 20, although the second portions 64 may also move in an outward direction indicating negative tension. In either case, tension on the saw blade 26 may be determined using the distance indicator 28 by measuring a relative distance differential of the second portion 64 of the saw blade 26 relative to a first position of the second portion 64 in which the two opposing electromagnets 20 are deactivated and a second position of the second portion 64 in which the two opposing electromagnets 20 are activated. After measuring the tension in the blade 26, the electromagnets 20 can be deactivated to release the blade 26 from the electromagnets 20. The blade 26 may then be detached from the holder 14 by pulling the blade 26 apart from the permanent magnets 16 on the holder 14. This allows for quick detachment of the blade 26 so that numerous blades 26 can be inspected in a relatively short period of time. The use of electromagnets 20 for testing tension also allows for quick and effective flexing of the blades 26 by switching a switch 42 to active the electromagnets 20, which minimizes the time required for the testing procedure to be performed and allows for consistent and accurate results.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A device comprising:

a holder configured to removably secure a saw blade to the holder, wherein the holder is further configured to rotate about an axis of rotation such that the saw blade is rotatable about the axis of rotation when the saw blade is secured to the holder, wherein the saw blade has a central bore opening, wherein a center of the central bore opening defines the axis of rotation when the saw blade is secured to the holder;

two opposing electromagnets each mounted in a position adjacent to a surface of the saw blade on a same side of the saw blade when the saw blade is secured to the holder, wherein the two opposing electromagnets are disposed adjacent to respective portions of the surface of the saw blade that are disposed on opposing sides of the central bore opening when the saw blade is secured to the holder, wherein the two opposing electromagnets are disposed at an angle of about 180 degrees from each other relative to the axis of rotation such that the two opposing electromagnets are linearly aligned with each other along a line that intersects the axis of rotation; and a distance indicator mounted in a position adjacent to the surface of the saw blade and configured to indicate variations of distance of the surface of the saw blade relative to the distance indicator when the saw blade is secured to the holder, wherein the two opposing electromagnets are each mounted in a position relative to the surface of the saw blade such that there is a gap between each of the two opposing electromagnets and the surface of the saw blade when an electric current to each of the two opposing electromagnets is turned off with the saw blade secured to the holder, wherein the two opposing electromagnets are configured to cause the surface of the saw blade to contact both of the two opposing electromagnets when the electric current to each of the two opposing electromagnets is turned on to induce a magnetic field, and wherein the two opposing electromagnets are further configured to cause the saw blade to flex when the electric current is turned on to induce a magnetic field, thereby causing surface deflections of the surface of the saw blade, and wherein the distance indicator is further configured to measure the surface deflections.

2. The device of claim 1, wherein the holder comprises a permanent magnet configured to removably secure the saw blade to the holder.

3. The device of claim 1, wherein the holder is configured to removably secure the saw blade to the holder in a position in which the saw blade is retained in a substantially vertical plane.

4. The device of claim 1, wherein the two opposing electromagnets are vertically aligned with each other.

5. The device of claim 4, wherein the position of each of the two opposing electromagnets is vertically adjustable.

6. The device of claim 1, wherein the holder is mounted onto an axle that defines the axis of rotation, wherein an axial position of the axle is axially adjustable such that a width of the gap is adjustable by adjusting the axial position of the axle.

7. The device of claim 1, wherein the distance indicator comprises a dial indicator.

8. The device of claim 1, wherein the position of the distance indicator is linearly adjustable along a line that is generally perpendicular to the axis of rotation.

9. The device of claim 8, wherein the line along which the position of the distance indicator is linearly adjustable is generally horizontal.

10. The device of claim 1, wherein the position of the distance indicator is linearly adjustable along a line that is generally perpendicular to a line extending directly between the two opposing electromagnets.

11. The device of claim 1, wherein the position of the distance indicator is about 90 degrees from the position of each of the two opposing electromagnets relative to the axis of rotation.

12. The device of claim 1, wherein the holder comprises a handle configured to allow manual rotation of the holder about the axis of rotation.

13. The device of claim 1, wherein the distance indicator is further configured to measure the surface deflections in a location of the surface of the saw blade that is about 90 degrees from both of the two opposing electromagnets relative to the axis of rotation.

14. A method of measuring tension of a circular saw blade, said method comprising the steps of:

providing a device comprising:

a holder configured to removably secure a saw blade to the holder, wherein the holder is further configured to rotate about an axis of rotation such that the saw blade is rotatable about the axis of rotation when the saw blade is secured to the holder, wherein the saw blade has a central bore opening, wherein a center of the central bore opening defines the axis of rotation when the saw blade is secured to the holder, two opposing electromagnets each mounted in a position adjacent to a surface of the saw blade on a same side of the saw blade when the saw blade is secured to the holder, wherein the two opposing electromagnets are disposed adjacent to respective portions of the surface of the saw blade that are disposed on opposing sides of the central bore opening when the saw blade is secured to the holder, wherein the two opposing electromagnets are disposed at an angle of about 180 degrees from each other relative to the axis of rotation such that the two opposing electromagnets are linearly aligned with each other along a line that intersects the axis of rotation, and a distance indicator mounted in a position adjacent to the surface of the saw blade and configured to indicate variations of distance of the surface of the saw blade relative to the distance indicator when the saw blade is secured to the holder, wherein the two opposing electromagnets are each mounted in a position relative to the surface of the saw blade such that there is a gap between each of the two opposing electromagnets and the surface of the saw blade when an electric current to each of the two opposing electromagnets is turned off with the saw blade secured to the holder, wherein the two opposing electromagnets are configured to cause the surface of the saw blade to contact both of the two opposing electromagnets when the electric current to each of the two opposing electromagnets is turned on to induce a magnetic field, wherein the two opposing electromagnets are further configured to cause the saw blade to flex when the electric current is turned on to induce a magnetic field, thereby causing surface deflections of the surface of the saw blade, and wherein the distance indicator is further configured to measure the surface deflections;

deactivating the two opposing electromagnets;

removably securing the saw blade to the holder such that there is a gap between each of the two opposing electromagnets and the surface of the saw blade;

activating the two opposing electromagnets by supplying an electric current to each of the two opposing electromagnets to induce a magnetic field, thereby causing the saw blade to flex due to opposing first portions of the saw blade being magnetically drawn toward and contacting each of the two opposing electromagnets to cause surface deflections of the surface of the saw blade; and using the distance indicator, measuring the surface deflections by measuring a relative distance differential of a second portion of the saw blade relative to a first position of the second portion in which the two opposing electromagnets are deactivated and a second position of the second portion in which the two opposing electromagnets are activated.

15. The method of claim 14, further comprising the steps of rotating the saw blade when the two opposing electromagnets are deactivated and using the distance indicator to measure variations of distance of the surface of the saw blade relative to the distance indicator as the saw blade rotates.

16. The method of claim 14, wherein the holder comprises a permanent magnet configured to removably secure the saw blade to the holder, wherein the step of removably securing the saw blade to the holder comprises magnetically securing the saw blade to the permanent magnet.

17. The method of claim 14, wherein the position of the distance indicator is linearly adjustable between an eye of the saw blade and an outer rim of the saw blade, wherein the method further comprises the step of adjusting the position of the distance indicator.

18. The method of claim 14, wherein the second portion of the saw blade defines a location of the surface of the saw blade at which the distance indicator measures the surface deflections, wherein the location of the second portion is about 90 degrees from both of the two opposing electromagnets relative to the axis of rotation.

* * * * *